United States Patent
Liu (10) Patent No.: US 8,789,800 B2
(45) Date of Patent: Jul. 29, 2014

(54) SUPPORTING APPARATUS

(75) Inventor: Li-Wei Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 28 days.

(21) Appl. No.: 13/567,806

(22) Filed: Aug. 6, 2012

(65) Prior Publication Data

US 2013/0075544 A1  Mar. 28, 2013

(30) Foreign Application Priority Data

Sep. 26, 2011  (TW) .............................. 100134614 A (51) Int. Cl.
A47F 5/00 (2006.01)

(52) U.S. Cl.
USPC .............. 248/122.1; 248/346.07; 248/346.04; 248/924; 248/316.4

(58) Field of Classification Search
USPC ................... 248/122.1, 346.07, 316.1, 176.1, 248/346.03, 924, 298.1, 310, 346.04, 125.2, 248/313, 316.4, 311.2, 149; 40/606.13
See application file for complete search history.

(56) References Cited

U.S. PATENT DOCUMENTS

| | | | | |
|---|---|---|---|---|
| 1,684,925 A * | 9/1928 | Perlmutter | ............... | 248/346.07 |
| 1,828,249 A * | 10/1931 | Gordon | .......................... | 248/154 |
| 2,250,361 A * | 7/1941 | Cullinan | ...................... | 248/146 |
| 2,665,872 A * | 1/1954 | De Witt | ......................... | 248/362 |
| 2,881,502 A * | 4/1959 | Dopera | .......................... | 432/259 |
| 4,118,002 A * | 10/1978 | Bartlett | ...................... | 248/311.2 |
| 5,299,769 A * | 4/1994 | Reusche et al. | ............ | 248/219.2 |
| 5,326,147 A * | 7/1994 | Watson | ......................... | 294/162 |
| 5,398,898 A * | 3/1995 | Bever | ............................ | 248/154 |
| 6,040,514 A * | 3/2000 | Liao | ............................... | 84/421 |
| 6,227,513 B1 * | 5/2001 | Richard | ................... | 248/346.07 |
| 6,375,134 B1 * | 4/2002 | Goldschmidt et al. | ........ | 248/154 |
| 6,416,029 B1 * | 7/2002 | Holtermanns | ........... | 248/346.06 |
| 6,585,212 B2 * | 7/2003 | Carnevali | ................. | 248/346.07 |
| 7,032,872 B2 * | 4/2006 | Sullivan | .................. | 248/346.07 |
| 7,503,536 B2 * | 3/2009 | Friederich et al. | ............ | 248/324 |
| 7,551,458 B2 * | 6/2009 | Carnevali | ...................... | 361/807 |
| D602,514 S * | 10/2009 | Dittmer | ........................ | D16/235 |
| 7,611,112 B2 * | 11/2009 | Lin | ............................. | 248/274.1 |
| D611,084 S * | 3/2010 | Anderson et al. | ............ | D16/235 |
| D633,548 S * | 3/2011 | Huang | .......................... | D16/235 |
| 7,918,427 B2 * | 4/2011 | Wang | ......................... | 248/278.1 |

(Continued)

FOREIGN PATENT DOCUMENTS

TW  M387468 U1  8/2010
TW  M407304 U1  7/2011

Primary Examiner — Terrell McKinnon
Assistant Examiner — Daniel Breslin
(74) Attorney, Agent, or Firm — Muncy, Geissler, Olds & Lowe, P.C.

(57) ABSTRACT

An adjustable electronic device supporter for supporting electronic devices of various sizes is disclosed. The electronic devices include a first side and a second side. The adjustable electronic device supporter includes a main body and a supporting base for supporting the main body. The main body includes a main supporting device with a first positioning slot, a first positioning pin, at least one first positioning hole, a first guiding slot, and a first moving pin. The first positioning pin contacts the first side and is situated in the first positioning slot. At least one first positioning hole connects to the first positioning slot, and the first positioning pin is selectively placed in one first positioning hole among the at least one first positioning holes. A first moving pin contacts the second side such that an electronic device is fixed between the first positioning pin and the first moving pin.

18 Claims, 9 Drawing Sheets

(56) References Cited

U.S. PATENT DOCUMENTS

| | | | |
|---|---|---|---|
| 8,027,464 B2 * | 9/2011 | Piekarz | 379/455 |
| 8,066,241 B2 * | 11/2011 | Yu et al. | 248/286.1 |
| 8,112,924 B2 * | 2/2012 | Longobardo | 40/606.13 |
| 8,240,628 B2 * | 8/2012 | Huang | 248/316.1 |
| D674,804 S * | 1/2013 | Cote | D14/447 |
| D686,629 S * | 7/2013 | Trinh et al. | D14/447 |

* cited by examiner

SUPPORTING APPARATUS

BACKGROUND OF THE DISCLOSURE

1. Field of the Disclosure

The disclosure relates to an adjustable electronic device supporter; more specifically, the disclosure relates to an adjustable electronic device supporter for supporting electronic devices of various sizes.

2. Description of the Related Art

As technology develops, portable electronic devices are commonly used, and various supporting devices for supporting the variety of portable electronic devices are available on the market. Those available supporting devices can be used only for supporting single portable electronic devices. For instance, a mobile phone supporting device can be used only for supporting a specific size of mobile phone; a tablet supporting device can be used only for supporting a specific size of tablet. For the various kinds of portable electronic devices needed supporting devices, it is necessary to buy different supporting devices for each. However, different supporting devices occupy indoor space, and users have to spend money to buy different supporting devices, both of which are not convenient for users.

Therefore, there is a need to provide a supporting device for supporting various portable electronic devices to obviate the problem of the prior art.

SUMMARY OF THE DISCLOSURE

It is an object of the disclosure to provide an adjustable electronic device supporter that for supporting electronic devices of various sizes.

To achieve the abovementioned object, the adjustable electronic device supporter of the disclosure for supporting electronic devices of various sizes, wherein the electronic devices include a first side and a second side, are disclosed. The adjustable electronic device supporter includes a main body and a supporting base, wherein the supporting base is used for supporting the main body. The main body includes a main supporting device and a lower supporting device. The main supporting device includes a first positioning slot, a first positioning pin, at least one first positioning hole, a first guiding slot, and a first positioning pin. The first positioning pin for contacting the first side is situated in the first positioning slot. The at least one first positioning hole connects to the first positioning slot, and the first positioning pin is selectively placed in one first positioning hole among the at least one first positioning hole to match the size of the electronic devices. The first moving pin for contacting the second side is situated in the first guiding slot such that the electronic devices can be fixed between the first positioning pin and the first moving pin. The lower supporting device for bearing the electronic devices is situated beneath the main supporting device.

According to one embodiment of the disclosure, the adjustable electronic device supporter of the disclosure further comprises an auxiliary supporting device situated between the main supporting device and the lower supporting device.

According to another embodiment of the disclosure, the supporting base of the adjustable electronic device supporter of the disclosure includes a bearing board and a supporting unit, wherein the bearing board and the supporting unit are integrally formed.

According to a further embodiment of the disclosure, the supporting base of the adjustable electronic device supporter of the disclosure further comprises a connection device, wherein the bearing board combines with the supporting unit via the connection device.

DETAILED DESCRIPTION OF THE PREFERRED EMBODIMENT

The advantages and innovative features of the disclosure will become more apparent from the following detailed descriptions when taken together with the accompanying drawings.

Figure 1:
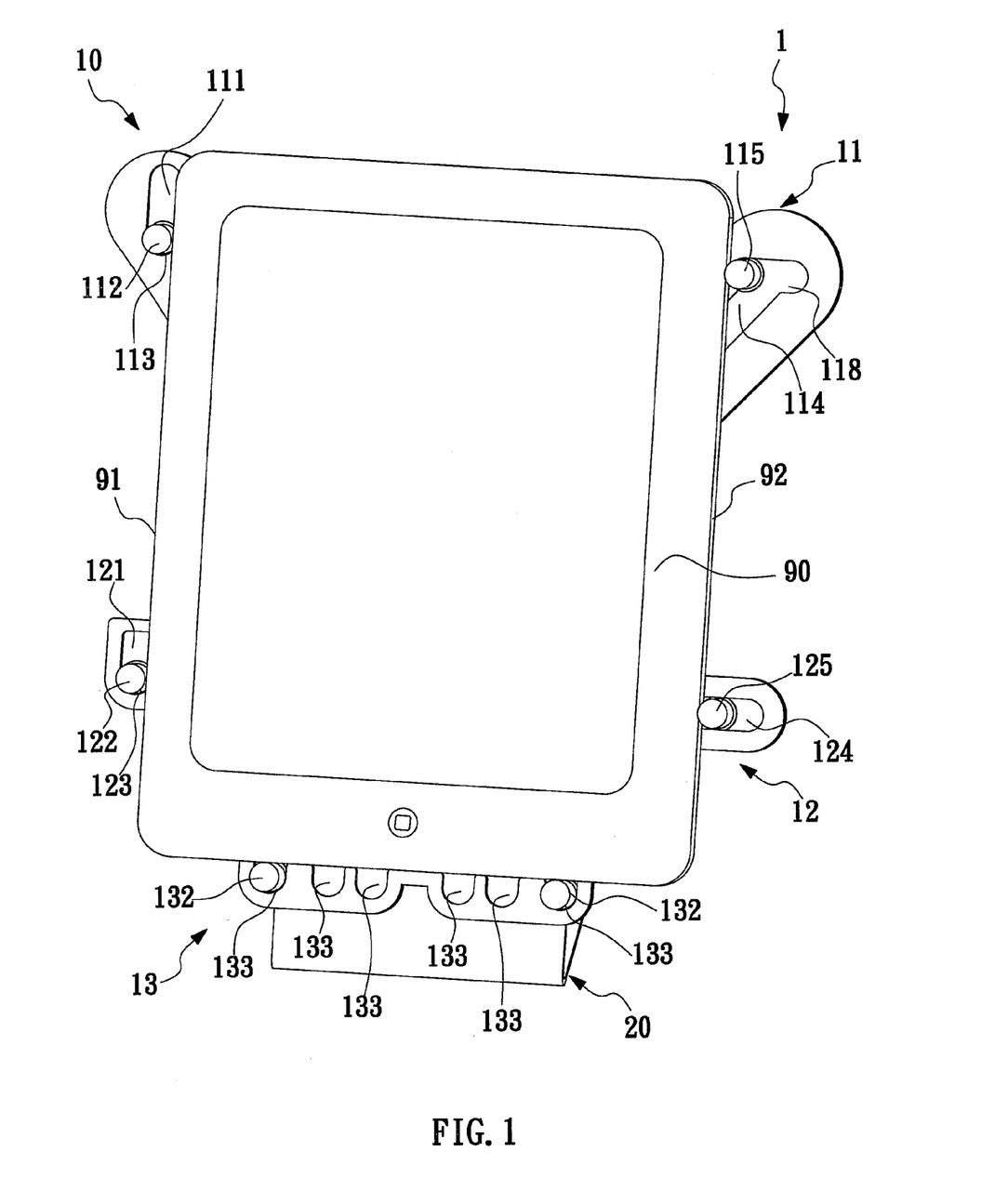
FIG. 1 illustrates a schematic view when an electronic device is mounted on one embodiment of the adjustable electronic device supporter of the disclosure.
Figure 2:
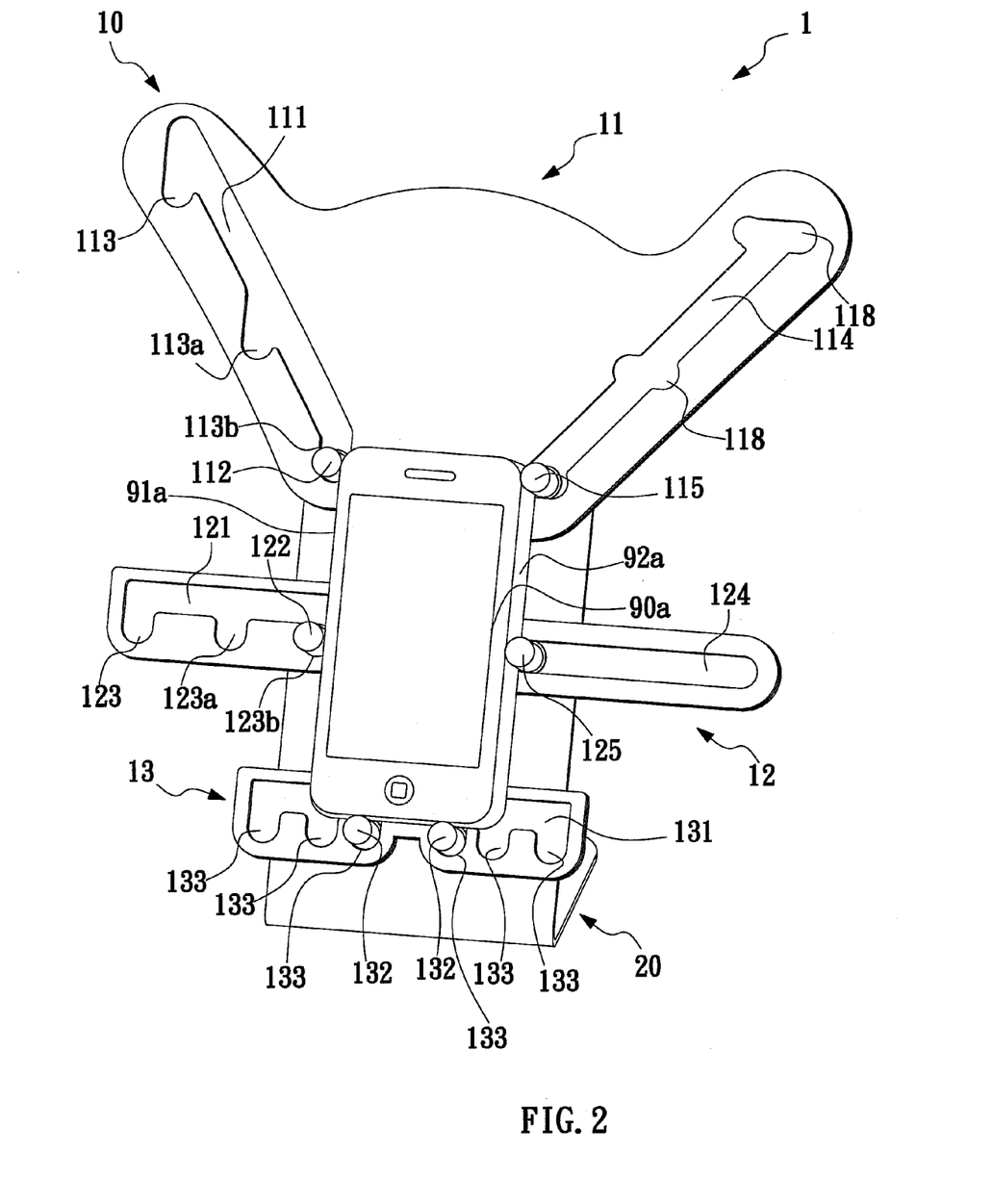
FIG. 2 illustrates a schematic view when another electronic device is mounted on one embodiment of the adjustable electronic device supporter of the disclosure.
Figure 3:
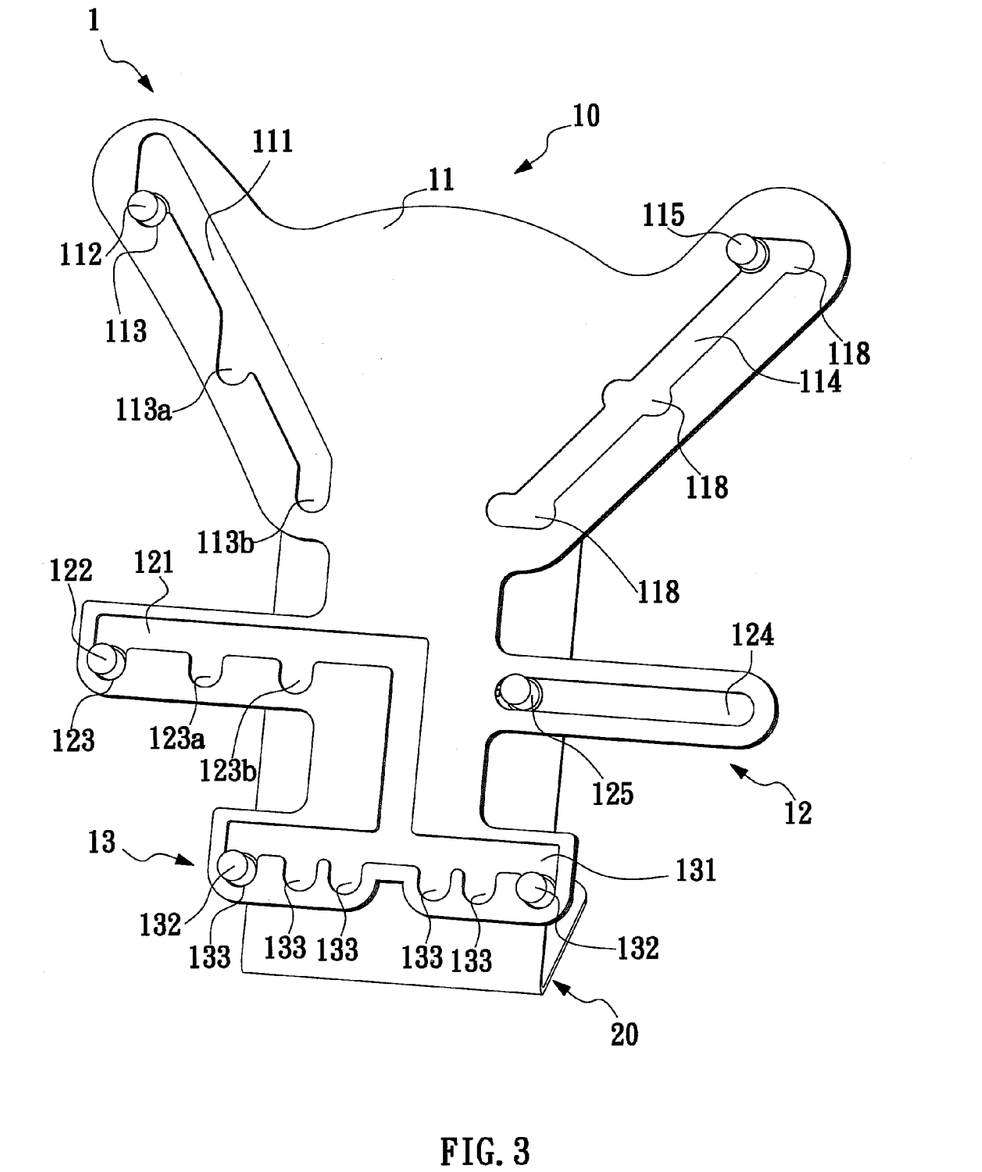
FIG. 3 is a schematic drawing of one embodiment of the adjustable electronic device supporter of the disclosure.
Figure 4:
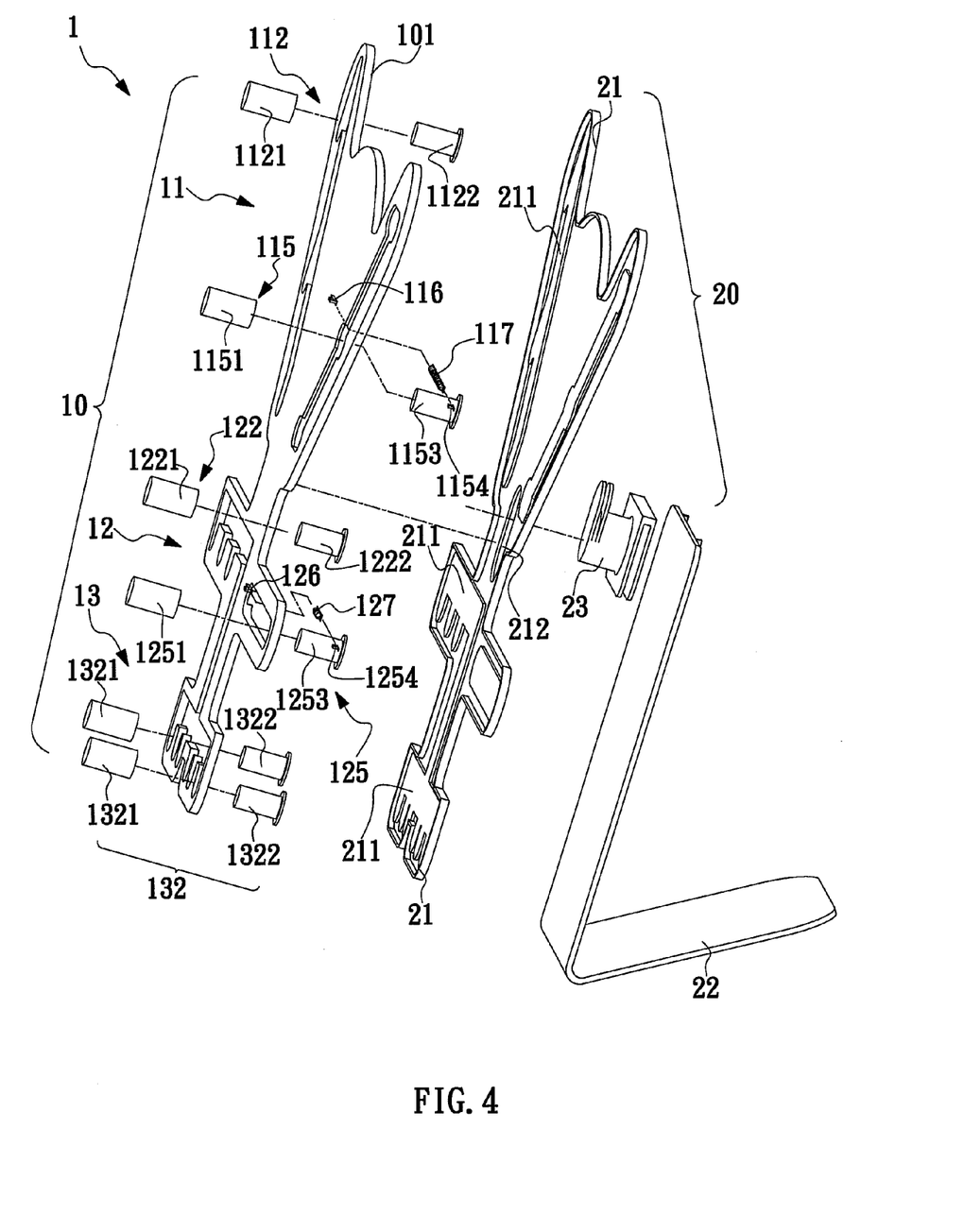
FIG. 4 illustrates an exploded view of one embodiment of the adjustable electronic device supporter of the disclosure.

Please refer to FIG. 1 to FIG. 4, related to embodiments of the adjustable electronic device supporter of the disclosure, wherein FIG. 1 illustrates a schematic view when an electronic device is mounted on one embodiment of the adjustable electronic device supporter of the disclosure; FIG. 2 illustrates a schematic view when another electronic device is mounted on one embodiment of the adjustable electronic device supporter of the disclosure; FIG. 3 is a schematic drawing of one embodiment of the adjustable electronic device supporter of the disclosure; and FIG. 4 illustrates an exploded view of one embodiment of the adjustable electronic device supporter of the disclosure. FIG. 4A to FIG. 4F are schematic drawings of various embodiments of the inner parts and the supporting base of the adjustable electronic device supporter of the disclosure.

As shown in FIG. 1 and FIG. 2, the adjustable electronic device supporter 1 of the disclosure is for supporting electronic devices of various sizes 90, 90a. The adjustable electronic device supporter 1 of the disclosure comprises a main body 10 and a supporting base 20, wherein the supporting base 20 is used for supporting the main body 10. The main body 10 of the adjustable electronic device supporter 1 of the disclosure comprises a main supporting device 11, an auxiliary supporting device 12, and a lower supporting device 13, wherein the auxiliary supporting device 12 is situated between the main supporting device 11 and the lower supporting device 13; the lower supporting device 13 is used for bearing the electronic devices 90, 90a.

According to one embodiment of the disclosure, as shown in FIG. 3 and FIG. 4, the main supporting device 11 of the adjustable electronic device supporter 1 of the disclosure comprises a first positioning slot 111, a first positioning pin 112, three first positioning holes 113, 113a, 113b, a first guiding slot 114, a first moving pin 115, a first hook 116, a first flexible member 117, and three buffer zones 118. The first positioning pin 112 is situated in the first positioning slot 111, and the first positioning pin 112 can be moved within the first positioning slot 111. The first positioning holes 113, 113a, 113b are separately connected to the first positioning slot 111; and in order to match the size of the electronic device 90 and the electronic device 90a, the first positioning pin 112 of the adjustable electronic device supporter 1 of the disclosure is selectively placed in one of the first positioning holes among the three first positioning holes 113, 113a, 113b. The abovementioned quantity of the first positioning holes 113 only illustrates an embodiment of the disclosure; however, the disclosure is not limited to this embodiment. For example, one first positioning hole 113 or five first positioning holes 113 are also applicable. The first positioning pin 112 can be further divided into a nonskid sleeve 1121 and a positioning cylinder 1122. The nonskid sleeve 1121 is wrapped above the positioning cylinder 1122 to assure that the first positioning pin 112 is skid-resistant. In this embodiment, the nonskid sleeve 1121 is made of rubber, but the disclosure is not limited to this embodiment; any skid-resistant material is applicable.

The first moving pin 115 is situated in the first guiding slot 114, wherein, as shown in FIG. 1 and FIG. 2, when the electronic device 90 or the electronic device 90a is placed on the adjustable electronic device supporter 1 of the disclosure, the first moving pin 115 contacts the second side 92 of the electronic device 90 or the electronic device 90a such that the electronic device 90 or the electronic device 90a is fixed between the first positioning pin 112 and the first moving pin 115. It is noted that, as shown in FIG. 1 and FIG. 2, each of the three buffer zones 118 is separately connected to the first guiding slot 114. The buffer zone 118 is used for minor adjustment of the contacting position of the first moving pin 115 and the second side 92. In addition, in order to match the size of the electronic device 90 and the electronic device 90a, the first moving pin 115 is selectively placed in one buffer zone 118 among any of the three buffer zones 118. The abovementioned quantity of the buffer zones 118 is for illustrating an embodiment of the disclosure only, and the disclosure is not limited to this embodiment. For example, one buffer zone 118 or five buffer zones 118 are both applicable.

Figure 4A:
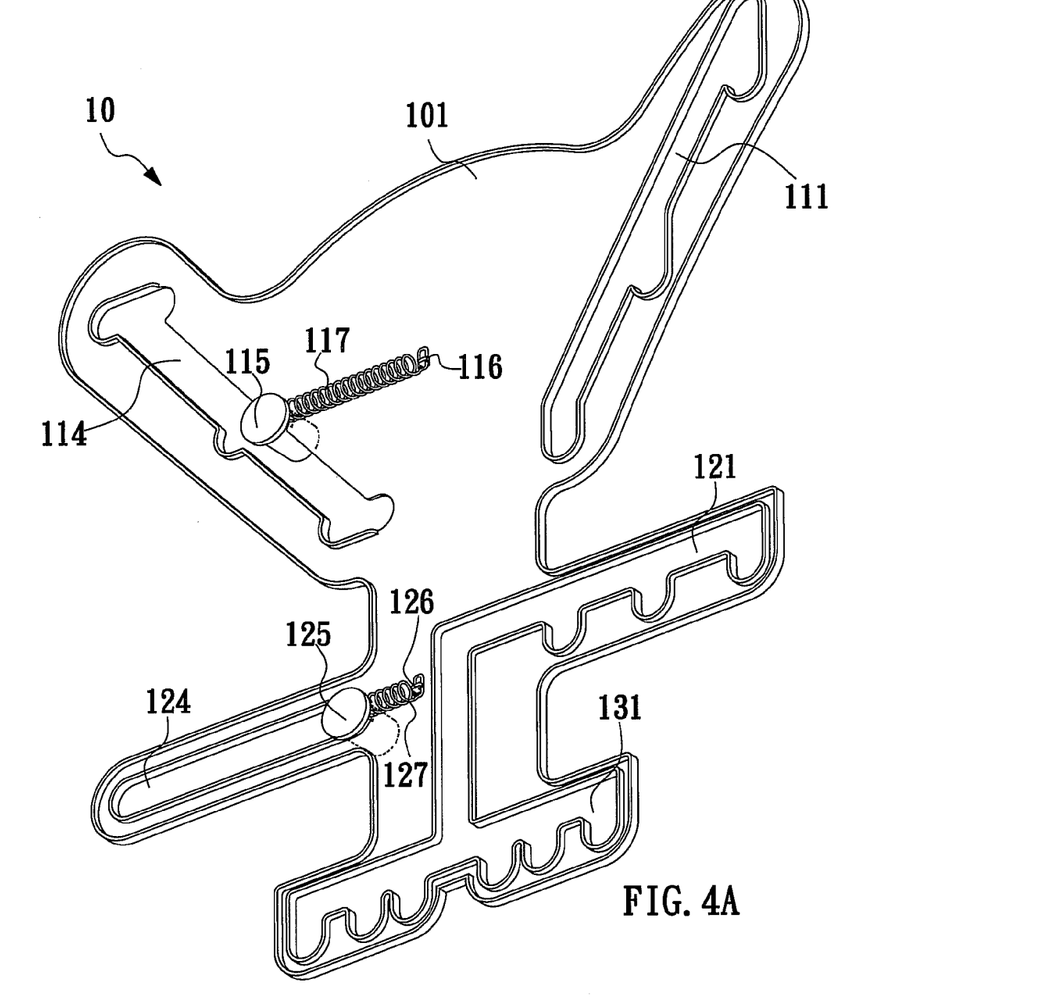
FIG. 4A is a schematic drawing of one embodiment of the back of the main body of the adjustable electronic device supporter of the disclosure.

As shown in FIG. 4 and FIG. 4A, the first hook 116 and the first flexible member 117 are both situated in the back 101 of the main body 10. The first flexible member 117 is connected to the first hook 116 and the first moving pin 115. The flexibility of the first flexible member 117 allows the first moving pin 115 to move within the first guiding slot 114. The first moving pin 115 can be fixed in a buffer zone 118 because of the flexibility of the first flexible member 117. According to one embodiment of the disclosure, the first hook 116 is located in a position where is about the same distance from the first positioning holes 113, 113a, 113b to avoid elastic fatigue due to the excessive strength of the first flexible member 117 after long-term use.

As shown in FIG. 3 and FIG. 4, the auxiliary supporting device 12 of the adjustable electronic device supporter 1 of the disclosure comprises a second positioning slot 121, a second positioning pin 122, three second positioning holes 123, 123a, 123b, a second guiding slot 124, a second moving pin 125, a second hook 126, and a second flexible member 127. The second positioning pin 122 is situated in the second positioning slot 121, and the second positioning pin 122 can be moved within the second positioning slot 121. Each of the second positioning holes 123, 123a, 123b are separately connected to the second positioning slot 121. In order to match the sizes of the electronic device 90 and the electronic device 90a, the second positioning pin 122 of the adjustable electronic device supporter 1 of the disclosure is selectively placed in a second positioning hole among any of the three second positioning holes 123, 123a, 123b. The abovementioned quantity of the second positioning holes 123 is for illustration of an embodiment of the disclosure only; the disclosure is not limited to this embodiment. For example, one second positioning hole 123 or five second positioning holes 123 are both applicable. The second moving pin 125 is situated in the second guiding slot 124. The second positioning pin 122 can be further divided into a nonskid sleeve 1221 and a positioning cylinder 1222. The nonskid sleeve 1221 is wrapped around the positioning cylinder 1222 such that the second positioning pin 122 is skid-resistant. Although in this embodiment, the nonskid sleeve 1221 is made of rubber, the disclosure is not limited to this embodiment; any skid-resistant material is applicable.

As shown in FIG. 4 and FIG. 4A, the second hook 126 and the second flexible member 127 are both situated in the back 101 of the main body 10, and the second flexible member 127 is connected to the second hook 12 and the second moving pin 125. The flexibility of the second flexible member 127 allows the second moving pin 125 to move within the second guiding slot 124. Furthermore, according to one embodiment of the disclosure, the first flexible member 117 and the second flexible member 127 are both springs. The disclosure is not limited to this embodiment; any flexible device is applicable.

Figure 4B:
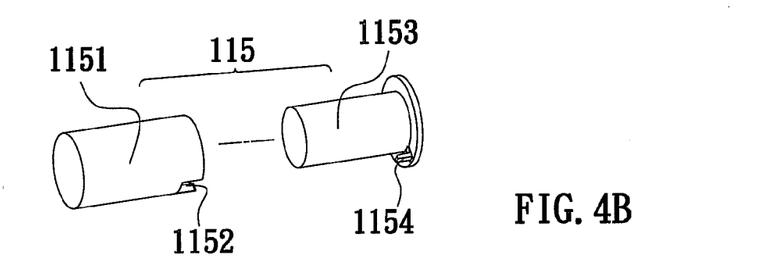
FIG. 4B illustrates an exploded view of one embodiment of the first moving pin of the disclosure.

As shown in FIG. 4A and FIG. 4B, for connecting to the first flexible member 117, the first moving pin 115 can be further divided into a nonskid sleeve 1151, a hole 1152, a moving cylinder 1153, and a hook 1154. The hole 1152 is situated at the opening end of the nonskid sleeve 1151. The nonskid sleeve 1151 is wrapped around the moving cylinder 1153, and the hook 1154 is situated on the moving cylinder 1153. After the nonskid sleeve 1151 is wrapping around the moving cylinder 1153, the hole 112 is used for allowing the hook 1154 to be exposed such that the hook 1154 can be connected to one end of the first flexible member 117 to form a connected state, illustrated in FIG. 4A; i.e., such that the first flexible member 117 and the first moving pin 115 are connected. According to one embodiment of the disclosure, the nonskid sleeve 1151 is made of rubber, but the disclosure is not limited to this embodiment, for any skid-resistant material is applicable. It is noted that the second moving pins 125 are also equipped with the nonskid sleeve 1251, the hole (not shown in this Fig.), the moving cylinder 1253, and the hook 1254 to facilitate the connection to the second flexible member 127. Because the structure of the second moving pin 125, is the same as that of the first moving pin 115, the description of the second moving pin 125 is omitted; please refer to the description of the first moving pin 115.

As shown in FIG. 3 and FIG. 4, according to one embodiment of the disclosure, the lower supporting device 13 of the adjustable electronic device supporter 1 of the disclosure further comprises a moving guiding slot 131, two supporting pins 132, and a plurality of third positioning holes 133, wherein the two supporting pins 132 are situated in the moving guiding slot 131, and both can move within the moving guiding slot 131. A plurality of third positioning holes 133 is connected to the moving guiding slot 131, and in order to match the size of the electronic devices 90, the two supporting pins 132 is selectively placed in any of the third positioning holes 133 to support the electronic devices 90, 90a. The abovementioned quantity of the supporting pins 132 and the third positioning holes 133 is for illustrating an embodiment of the disclosure only; the disclosure is not limited to this embodiment. For example, one supporting pin 132, three supporting pins 132, or one third positioning hole 133 are also applicable. The supporting pin 132 can be further divided into a nonskid sleeve 1321 and a supporting pin 1322, and the nonskid sleeve 1321 is wrapped above the supporting pin 1322 such that the supporting pin 132 is skid-resistant. Although in this embodiment of the disclosure, the nonskid sleeve 1321 is made of rubber, the disclosure is not limited to this embodiment; any skid-resistant material is applicable.

It is noted that, as shown in FIG. 3, according to one embodiment of the disclosure, the second positioning slot 121 of the disclosure is interlinked to the moving guiding slot 131 for allowing the second positioning pin 122 to move into the third positioning hole 133 to support electronic devices 90 together with the second positioning pin 122 and the supporting pin 132 to increase the supporting force of the adjustable electronic device supporter 1 of the disclosure while supporting support electronic devices. The disclosure is not limited to this embodiment; the second positioning slot 121 and the moving guiding slot 131 do not have to be interlinked.

As shown in FIG. 4, according to one embodiment of the disclosure, the supporting base 20 comprises a bearing board 21, a supporting unit 22, and a connection device 23, wherein the bearing board 21 is used for connecting with the main body 10; the supporting unit 22 is used for supporting the main body 10 and the bearing board 21; the bearing board 21 and the supporting unit 22 are connected via the connection device 23. It is noted that the bearing board 21 has an opening 212 for connecting the connection device 23 and the bearing board 21. In addition, the supporting unit 22 has two positioning ribs 221 for connecting with the connection device 23 such that the adjustable electronic device supporter 1 of the disclosure is selectively placed on a surface. The disclosure is not limited to this embodiment; any form of combination is applicable.

Figure 4C:
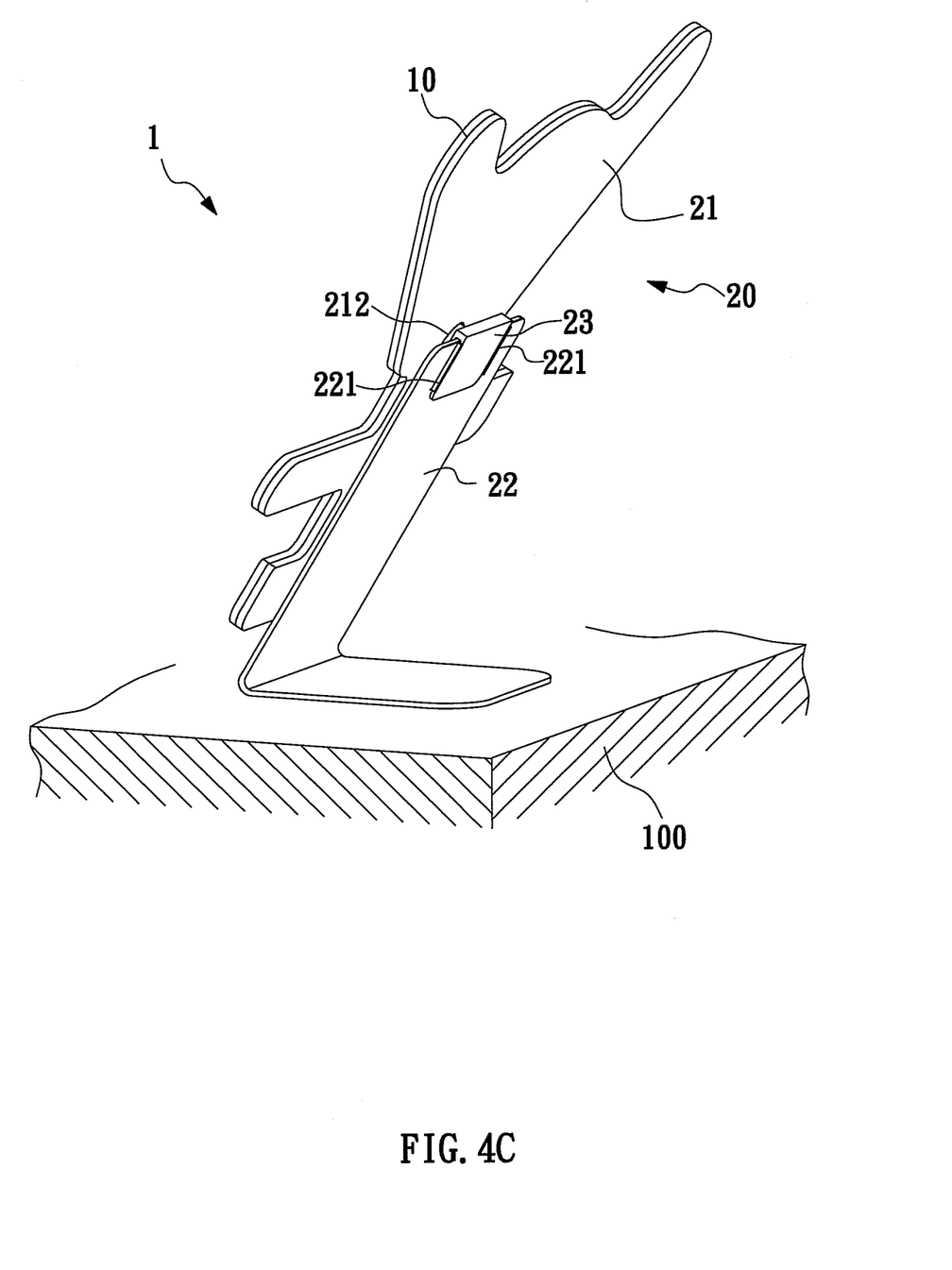
FIG. 4C is a schematic drawing of one embodiment of the adjustable electronic device supporter of the disclosure standing on a surface.
Figure 4D:
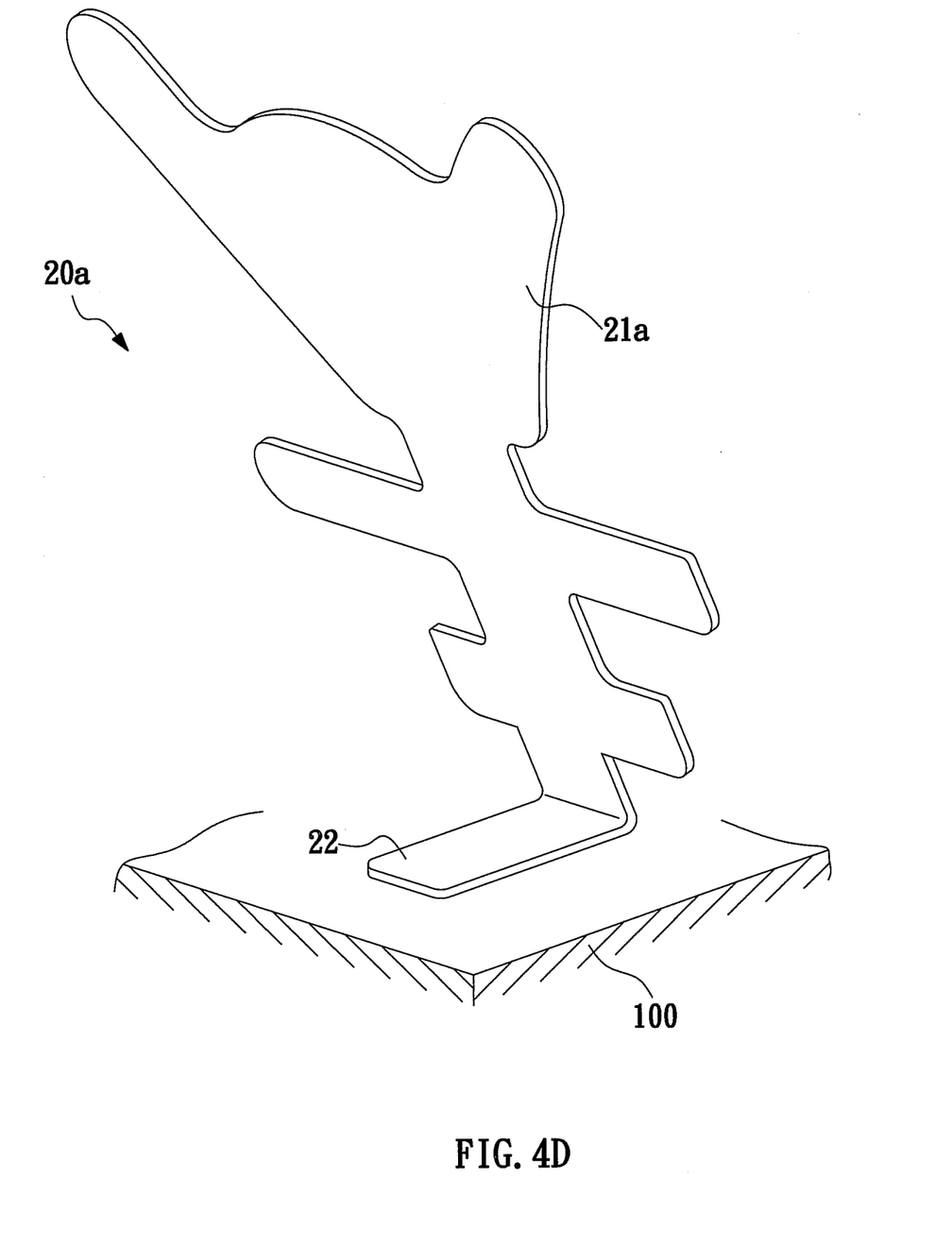
FIG. 4D is a schematic drawing of one embodiment of the supporting base of the disclosure.
Figure 4E:
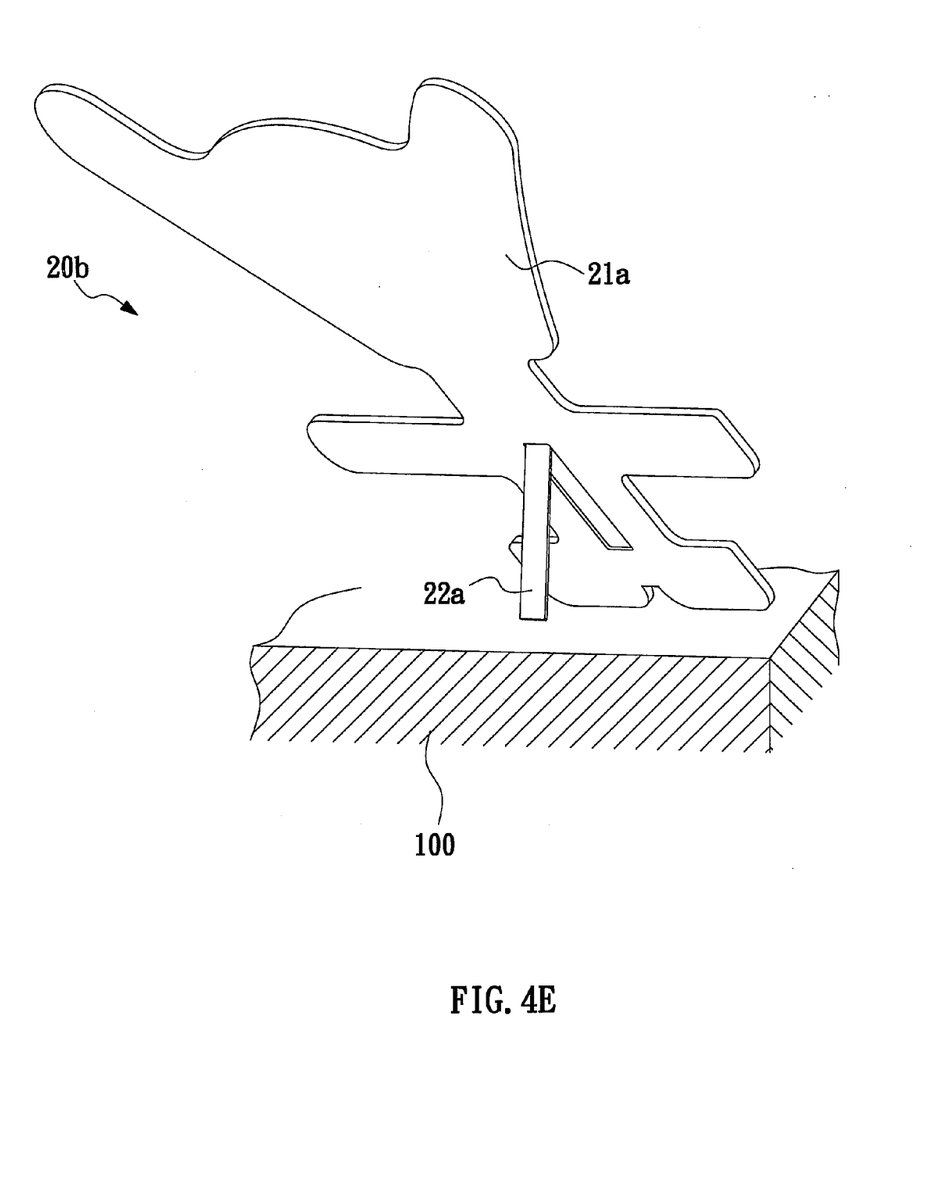
FIG. 4E is a schematic drawing of another embodiment of the supporting base of the disclosure.

Due to the design of the supporting base 20, as shown in FIG. 4C, the adjustable electronic device supporter 1 of the disclosure is selectively placed on a surface 100. It is noted that the bearing board 21 of the supporting base 20 can be directly formed with the supporting unit 22 in an integrated structure; i.e., without the connection device 23 to form a supporting base 20a, 20b as shown in FIG. 4D or FIG. 4E. The opening 212 is not needed for the bearing board 21a. It is noted that the shape of the supporting base 20 of the disclosure is not limited to the abovementioned embodiments, as long as the adjustable electronic device supporter 1 of the disclosure can be stably placed on the surface 100.

Figure 4F:
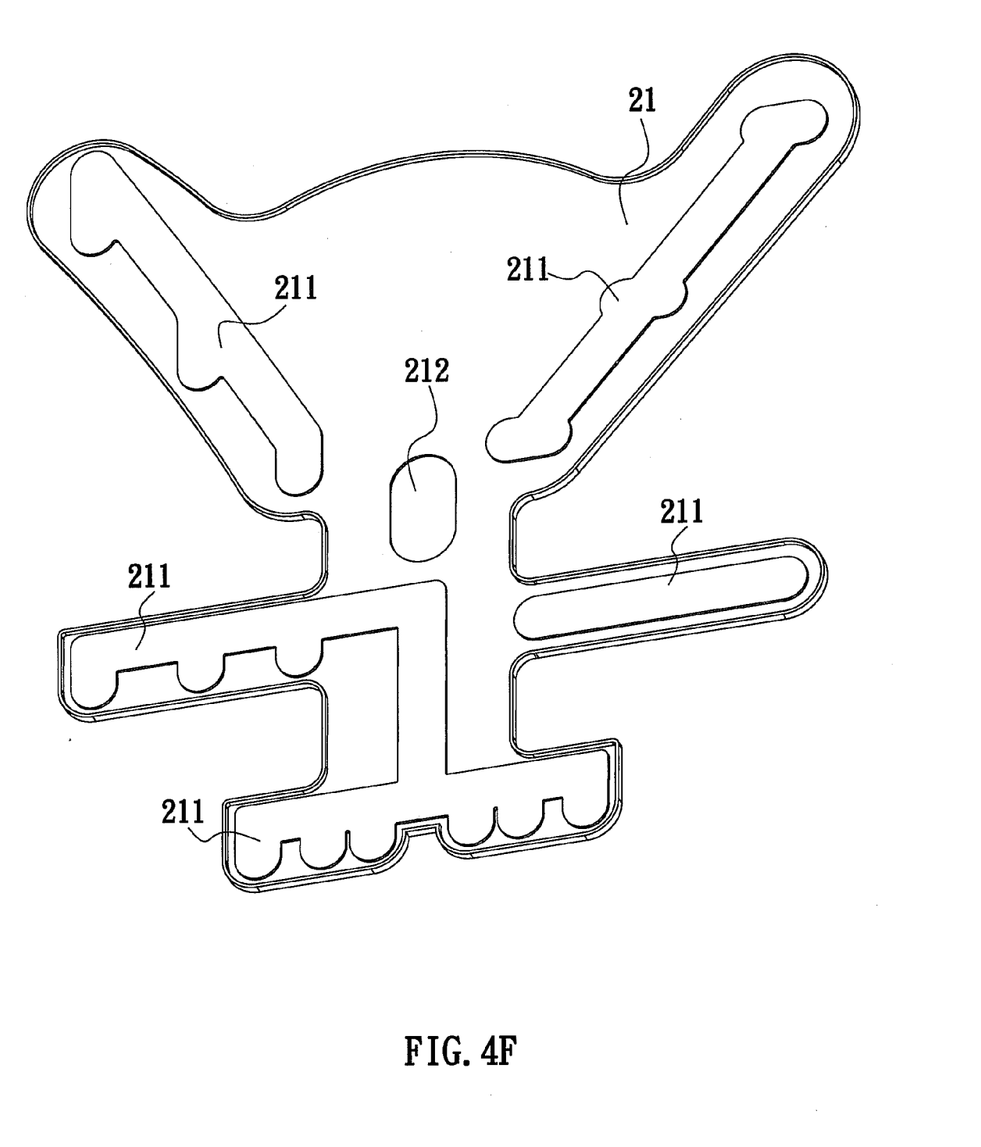
FIG. 4F is a schematic drawing of the front of one embodiment of the bearing board of the disclosure.

As shown in FIG. 4 and FIG. 4F, the bearing board 21 has a plurality of protruding terraces 211, whose positions correspond to the first positioning slot 111, the first guiding slot 114, the second positioning slot 121, the second guiding slot 124, and the at least one moving guiding slot 131 to prevent the first positioning pin 112, the second positioning pin 122, the first moving pin 115, the second moving pin 125, and the supporting pin 132 from falling away from the corresponding slots.

Please refer to FIG. 1 again. As shown in FIG. 1, if the electronic device 90 is placed on the adjustable electronic device supporter 1, the first positioning pin 112 is moved to the first positioning hole 113; the second positioning pin 122 is moved to the second positioning hole 123 such that the first positioning pin 112 and the second positioning pin 122 contact the first side 91 of the electronic device 90 separately, and two supporting pins 132 are placed into any of the third positioning holes 133. Then the first moving pin 115 and the second moving pin 125 contact the second side 92 of the electronic device 90 to clamp the electronic device 90 between the first positioning pin 112, the second positioning pin 122, the first moving pin 115, and the second moving pin 125 due to the flexibility of the first flexible member 117 and the second flexible member 127. In addition, the electronic device 90 can be steadily fixed on the adjustable electronic device supporter 1 of the disclosure by the supporting force from the two supporting pins 132. Moreover, because of the manufacturing tolerance, even electronic devices 90 with same specifications have subtle differentiation in terms of size. The main supporting device 11 of the adjustable electronic device supporter 1 of the disclosure is equipped with the buffer zone 118 for subtle adjustment of the contacting position of the first moving pin 115 and the second side 92 to compensate for the size discrepancy of the electronic devices 90. In this embodiment, the electronic device 90 is a tablet.

Please refer to FIG. 2 again. As shown in FIG. 2, according to one embodiment of the disclosure, if the electronic device 90a is a mobile phone, the first positioning pin 112 is moved to the first positioning hole 113b, the second positioning pin 122 is moved to the second positioning hole 123b; and the two supporting pins 132' are moved to the third positioning holes 133 beneath the electronic device 90a. The first moving pin 115 and second moving pin 125 contact the second side 92 of the electronic device 90a to clamp the electronic device 90 between the first positioning pin 112, the second positioning pin 122, the first moving pin 115, and the second moving pin 125 due to the flexibility of the first flexible member 117 and the second flexible member 127. The electronic device 90a can be steadily fixed on the adjustable electronic device supporter 1 of the disclosure by the supporting force from the two supporting pins 132.

To sum up, with movement of the first positioning pin 112 and the second positioning pin 122 separately to different first positioning holes 113 or second positioning holes 123, the adjustable electronic device supporter 1 of the disclosure can be used for supporting electronic devices with sizes of 10 inches, 7.5 inches, or 3.5 inches via collocation among the first moving pin 115, the second moving pin 125, the first flexible member 117, and the second flexible member 127. It is noted that the quantity of the first positioning holes 113 and the second positioning holes 123 and the size of the electronic devices are not limited to the above-mentioned embodiments. Furthermore, the function of the lower supporting device 13 in the disclosure is mainly to support the weight of the electronic devices 90, 90a. The two supporting pins 132 can be replaced with non-moving supporting pins or a supporting board. As a result, the supporting pins 132 and the moving guiding slots 131 are not necessary, and the disclosure does not require the auxiliary supporting device 12 because the main supporting device 11 is sufficient for preventing the lateral slippage of the electronic devices 90, 90a.

It must be noted that the above-mentioned embodiments are only for illustration. It is intended that the disclosure covers modifications and variations of this disclosure provided that they fall within the scope of the following claims and their equivalents. Therefore, it will be apparent to those skilled in the art that various modifications can be made to the structure of the disclosure without departing from the scope or spirit of the disclosure.

What is claimed is:

1. An adjustable electronic device supporter for supporting electronic devices of various sizes, wherein the electronic devices comprise a first side and a second side, the adjustable electronic device supporter comprising:
   a main body comprising:
      a main supporting device comprising:
         a first positioning slot;
         a first positioning pin, situated in the first positioning slot, for contacting the first side;
         at least one first positioning hole connected to the first positioning slot; the first positioning pin is selectively placed in one first positioning hole among the at least one first positioning holes to match the size of the electronic devices;
      a first guiding slot;
         a first moving pin situated in the first guiding slot for contacting the second side to allow the electronic devices to be fixed between the first positioning pin and the first moving pin;
         a first hook and a first flexible member, wherein the first hook and the first flexible member are both situated in a back of the main body and the first flexible member connects to the first hook and the first moving pin;
      a lower supporting device situated beneath the main supporting device for bearing the electronic devices;
      an auxiliary supporting device situated between the main supporting device and the lower supporting device; and
      a supporting base for supporting the main body.

2. The adjustable electronic device supporter as claimed in claim 1, wherein the auxiliary supporting device further comprises a second positioning slot, a second positioning pin, and at least one second positioning hole, wherein the second positioning pin for contacting the first side is situated in the second positioning slot; the second positioning slot connects to the at least one second positioning hole; and the second positioning pin can be placed in one second positioning hole among the at least one second positioning holes to match the size of the electronic devices.

3. The adjustable electronic device supporter as claimed in claim 2, wherein the auxiliary supporting device further comprises a second guiding slot and a second moving pin, wherein the second moving pin is situated in the second moving guiding slot and is used for contacting the second side.

4. The adjustable electronic device supporter as claimed in claim 3, wherein the auxiliary supporting device further comprises a second hook and a second flexible member, wherein the second hook and the second flexible member are both situated in the back of the main body and the second flexible member connects to the second hook and the second moving pin.

5. The adjustable electronic device supporter as claimed in claim 4, wherein the lower supporting device further comprises at least one moving guiding slot and at least one supporting pin, wherein the at least one supporting pin is situated in the moving guiding slot.

6. The adjustable electronic device supporter as claimed in claim 5, wherein the supporting base comprises a bearing board having a plurality of protruding terraces whose positions correspond to the first positioning slot, the first guiding slot, the second positioning slot, the second guiding slot, and the at least one moving guiding slot.

7. The adjustable electronic device supporter as claimed in claim 5, wherein the main supporting device further comprises at least one buffer zone and the first moving pin can be placed in a buffer zone among the at least one buffer zones to match the size of an electronic device.

8. The adjustable electronic device supporter as claimed in claim 5, wherein the lower supporting device further comprises at least one third positioning hole connected to the at least one moving guiding slot; and the at least one supporting pin can be placed in one third positioning hole among the at least one third positioning holes to match the size of an electronic device.

9. The adjustable electronic device supporter as claimed in claim 8, wherein the supporting base comprises a bearing board and a supporting unit, wherein the bearing board is used for combining with the main body; and the supporting unit is used for supporting the main body and the bearing board.

10. The adjustable electronic device supporter as claimed in claim 9, wherein the bearing board has a plurality of protruding terraces whose positions correspond to the first positioning slot, the first guiding slot, the second positioning slot, the second guiding slot, and the at least one moving guiding slot.

11. The adjustable electronic device supporter as claimed in claim 10, wherein the bearing board and the supporting unit are integrally formed.

12. The adjustable electronic device supporter as claimed in claim 10, wherein the supporting base further comprises a connection device, wherein the bearing board combines with the supporting unit via the connection device.

13. The adjustable electronic device supporter as claimed in claim 10, wherein the main supporting device further comprises at least one buffer zone; the first moving pin can be placed in one buffer zone among the at least one buffer zones to match the size of an electronic device.

14. An adjustable electronic device supporter for supporting electronic devices of various sizes, wherein the electronic devices comprise a first side and a second side, the adjustable electronic device supporter comprising:
    a main body comprising:
       a main supporting device comprising:
          a first positioning slot;
          a first positioning pin, situated in the first positioning slot, for contacting the first side;
          at least one first positioning hole connected to the first positioning slot; the first positioning pin is selectively placed in one first positioning hole among the at least one first positioning holes to match the size of the electronic devices;
       a first guiding slot;
          a first moving pin situated in the first guiding slot for contacting the second side to allow the electronic devices to be fixed between the first positioning pin and the first moving pin;
          a first hook and a first flexible member, wherein the first hook and the first flexible member are both situated in a back of the main body and the first flexible member connects to the first hook and the first moving pin;
       a lower supporting device, situated beneath the main supporting device for bearing the electronic devices, comprising at least one moving guiding slot and at least one supporting pin, wherein the at least one supporting pin is situated in the moving guiding slot; and
       a supporting base for supporting the main body.

15. The adjustable electronic device supporter as claimed in claim 14, wherein the supporting base comprises a bearing board with a plurality of protruding terraces whose positions correspond to the first positioning slot, the first guiding slot, the second positioning slot, the second guiding slot, and the at least one moving guiding slot.

16. The adjustable electronic device supporter as claimed in claim 14, wherein the main supporting device further comprises at least one buffer zone; the first moving pin can be placed in one buffer zone among the at least one buffer zones to match the size of an electronic device.

17. The adjustable electronic device supporter as claimed in claim 14, wherein the lower supporting device further comprises at least one third positioning hole connected to the at least one moving guiding slot; and the at least one supporting pin can be placed in a third positioning hole among the at least one third positioning holes to match the size of the electronic devices.

18. The adjustable electronic device supporter as claimed in claim 17, wherein the supporting base comprises a bearing board and a supporting unit, wherein the bearing board is used for combining with the main body and the supporting unit is used for supporting the main body and the bearing board.

\* \* \* \* \*